3,235,453
PHENOTHIAZINE COMPOSITION AND PROCESS
FOR PREPARING SAME
Donald E. Vierling, 4594 Doverdell Drive, and James
Coull, 317 Fieldbrook Drive, both of Pittsburgh, Pa.
No Drawing. Filed Jan. 9, 1962, Ser. No. 165,245
5 Claims. (Cl. 167—53)

This is a continuation-in-part of our patent application Serial No. 139,866, filed September 22, 1961, entitled "Phenothiazine Composition and Process for Preparing Same."

This invention relates to a novel phenothiazine composition and to a process for preparing the same.

On page 48 of the United States Department of Agriculture Bulletin ARS 20–9, of September 1960, entitled "The Nature and Fate of Chemicals Applied to Soils, Plants and Animals," there is an article by Foster et al., bearing the title "Use of Chemicals for Control of Parasites of Food Animals." In this article, the authors state that, in 1954, the Department of Agriculture estimated that internal and external parasites were about equally responsible for losses which exceeded one billion dollars annually at the farm level. Also, that developments during the intervening six years indicated that the estimate had been conservative. The magnitude of the problem is, therefore, extremely serious and its solution highly desirable.

Because of the fact that phenothiazine has a greater efficiency against internal parasites than any other anthelmintic, it has been the anthelmintic of choice since 1940. The procedures generally employed in the preparation of phenothiazine are old and well known. Usually, diphenylamine and sulphur are reacted together in approximately stoichiometric amounts; that is, about one mol of diphenylamine with about two mols of sulphur in the presence of a controlled amount, which can be about two percent by weight of the reactants, of a suitable condensation catalyst, such as aluminum chloride, aluminum bromide, ferric chloride, iodine, copper iodide, etc., at a temperature of about 180° C. to about 200° C. and a pressure of about 14 to about 20 pounds per square inch gauge for a time which can be from about one to about eight hours. Hydrogen sulphide gas is given off; and a molten mixture comprising mainly phenothiazine and from about two to about ten percent by weight of impurities consisting essentially of analogs of phenothiazine, such as phenothiazine sulfoxide, is obtained.

At this point in the manufacture of phenothiazine, one of two procedures can be followed, as will be described immediately hereinafter. The molten mixture, including the impurities associated therewith, can be passed into cooling pans wherein the mixture is permitted to solidify over a period of about one to about four hours. The phenothiazine so obtained is extremely brittle and can easily be broken up by the use of a shovel, hoe, scraper or similar instrument into lumps that are approximately two inches by three inches by one inch thick. The phenothiazine so produced has a purity of about 90 percent and possesses a freezing point of about 179° to about 180° C. Pure phenothiazine has a freezing point of 185.1° C. By "freezing point," reference is made to the temperature at which phenothiazine will transfer from its molten to its solid or crystalline stage in accordance with the definition thereof appearing in "The National Formulary," tenth edition, 1955.

Alternatively, the molten mixture defined hereinabove can be purified before it is passed into the cooling pans. A method for doing this is described and claimed in our U.S. Patent No. 2,887,482, dated May 19, 1959. According to this method, the impure phenothiazine, admixed with about one-half to about 50 percent by weight of silicon dioxide of an average particle size varying from about three and one-half to about 400 mesh or more, is heated to a temperature of at least about 300° C. and then subjected to suitable distillation conditions. Silicon dioxide and a substantial proportion of the impurities are left behind. Purified phenothiazine distills over and is passed into cooling pans where it is cooled into blocks and thereafter broken into lumps in the manner previously described. The phenothiazine obtained by this procedure has a purity of about 99.8 percent and a freezing point of about 184.5° C. to about 184.9° C.

The mode of action of phenothiazine in controlling internal parasites in livestock animals, like many other drugs, including aspirin, is not scientifically known. It is generally known that, in the treatment of livestock animals to control internal parasites, the greater the purity of phenothiazine, the more effective it becomes, although the reason therefor is not known. It is believed that, when phenothiazine is cooled from the molten mixture described hereinabove, the impurities associated therewith have a tendency to coat the individual phenothiazine crystal and thus render the same ineffective.

It is also well known that there exists a direct relationship between the size of the individual phenothiazine particle and its anthelmintic efficiency. The smaller the particle size, the more effective it becomes as an anthelmintic. This point was well emphasized, for example, in a paper entitled "The Relationship Between Particle Size in Anthelmintic Efficiency of Phenothiazine," by Douglas et al., appearing in American Journal of Veterinary Research, volume 17, No. 63, April 1956, pages 318–323. It is therein stated that, although the action of phenothiazine on internal parasites is not clearly understood, evidence would seem to suggest that the drug enters the body of the parasite through the cuticle, rather than orally. It would seem logical to assume, then, that, since phenothiazine is relatively insoluble in water, and probably also in digestive contents, its action on the worm is by direct solution from the solid state through the cuticle, similar to the phenomenon observed when many insects are exposed to solid insecticide particles. Therefore, the smaller the size of the individual phenothiazine particle, the easier it is for the same to enter the cuticle of the parasite.

Another theory which has been advanced for the increased efficiencies obtained from the use of phenothiazine of small particle size is that, by reducing the particle size of the individual phenothiazine particle, more particles per unit weight of phenothiazine are obtained. Recognizing that phenothiazine is a contact drug, and following the laws of probability, it inherently follows that there is a greater chance of a particle of phenothiazine coming in contact with a parasite due to the increased number thereof per unit weight. This, of course, means that the chance of a parasite coming in contact with a phenothiazine particle is very great.

Purification of impure phenothiazine can be effected in a number of ways, including the method described and claimed in the aforementioned U.S. Patent No. 2,887,482. On the other hand, obtaining phenothiazine of an extremely small particle size has presented formidable obstacles. Particle size, as defined herein, will refer to the average particle size of phenothiazine as determined on a Fisher Sub-Sieve Sizer made by Fisher Scientific Company, of Pittsburgh, Pennsylvania.

When phenothiazine was first manufactured in about 1940, the procedure employed to obtain phenothiazine of small particle size involved, as an initial step, subjecting the lumps of phenothiazine obtained from the cooling pans, hereinabove described, to the action of a mechanical crusher provided with revolving blades to obtain pea-size particles of phenothiazine of approximately one-half inch by one-half inch by one-half inch in size. This pre-crushed phenothiazine was then fed into an ordinary hammer mill wherein it was reduced to an average particle size of approximately 30 microns. While phenothiazine of such size was found to possess fair anthelmintic properties, the efficiency thereof was not as great as with phenothiazine of smaller particle size. The next step was the use of a Micro-Pulverizer (manufactured by Pulverizing Machinery Company, Summit, New Jersey) wherein the particle size of the phenothiazine was further reduced to approximately 15 microns. By using finer screens in this Micro-Pulverizer, adjusting the feed input, and making other refinements, it was found that phenothiazine could be reduced to an average particle size of about six to seven microns. Phenothiazine obtained by this procedure was subjected to the action of a Micro-Atomizer, which is a combination hammer mill and air classification mill. By this means, the phenothiazine was reduced to a particle size of about four to five microns. Phenothiazine of the same particle size can also be obtained by using a ball mill, but the economics thereof render its use exceedingly expensive.

The next step involved the use of an air-attrition mill, wherein the material to be micronized was injected into a stream of air or other inert gas at high pressure (for example, 125 pounds per square inch gauge) and high volume flow (for example, 1600 cubic feet per minute). The flow of inert gas is effective in imparting extremely high velocity to the particle to be micronized. The particles, upon contact with each other, will fracture into other particles of extremely small size. When the particles have reached a desired size, they are carried off in an air stream and air classified. The fine particles are caught in dust collectors and packaged. A micronizing mill of this type is manufactured by Fluid Energy Processing and Equipment Company, of Philadelphia, Pennsylvania. By the employment of this method, phenothiazine has been reduced to a particle size of between two and three microns. Due to the high cost of producing the large flow of high pressure inert gas, however, this method is also extremely expensive. Moreover, it is practically impossible to produce by this method phenothiazine having a particle size of less than about 1.7 microns regardless of time or cost.

Phenothiazine has also been reduced to a particle size of about two to three microns by the wet-milling process. After the phenothiazine has been reduced to pea-size and then to smaller size by any of the methods referred to hereinabove, it is, in the wet-milling process, mixed with a liquid, such as water and a wetting agent, until the mixture becomes of muddy consistency. This material is then introduced into a ball mill or rod mill and subjected to continuous grinding for a long period of time, for example, about eight hours, until the particle size is reduced to about two to three microns. Unfortunately, this procedure is very costly and involves a time-consuming operation.

Although, as aforementioned, phenothiazine is an excellent anthelmintic or dewormer for livestock, and efforts described hereinbefore have resulted in increasing the purity and decreasing the particle size thereof, thereby greatly increasing the anthelmintic efficiencies of phenothiazine, difficulties are still encountered in inducing the host animal to consume the same in truly therapeutic amounts. This is so because livestock animals do not like the taste of phenothiazine. In an attempt to overcome this obstacle, phenothiazine was formed into a large pill or bolus; or a drench slurry comprised of phenothiazine, bentonite clay and water was prepared. Afterwards, the cattle to be treated were rounded up; and such pills or drench slurries were administered to the cattle with great difficulty. In order to induce free choice administration of phenothiazine, attempts have been made to flavor or add other appetizing ingredients thereto, such as corn syrup or black-strap molasses, so that the resulting composition would be palatable to the host animal.

From the foregoing, it is apparent that the art recognizes the desirability of producing phenothiazine of extremely high purity and small particle size, and of the advantages of preparing a phenothiazine composition which will be willingly consumed by the host animal. The novel composition of this invention prepared by a procedure hereinbefore completely unknown to us possesses all of the desirable features sought in a phenothiazine composition as described hereinabove.

According to the teachings of the present invention, the first step involves the placing of phenothiazine in solution utilizing a liquid solvent. The phenothiazine employed can be of any size or any of the types of phenothiazine defined hereinabove, By "liquid solvent" we mean to include any liquid in which phenothiazine is soluble, at atmospheric temperature and atmospheric pressure, to the extent of at least about five grams of phenothiazine per one thousand grams of said liquid. In addition, the liquid solvent must be one which will not introduce appreciable contaminants into the reaction system, or which will not adversely react with the phenothiazine or other materials which will enter the system. Representative liquid solvents which can be employed include aromatics, such as benzene; alcohols, such as methyl alcohol and ethyl alcohol; organic acids, such as formic acid and acetic acid; ketones, such as acetone and methyl ethyl ketone; ethers, such as diethyl ether; mineral oils; organic amides, such as dimethyl formamide; etc. The amount of solvent needed is at least that amount which is required to dissolve the phenothiazine at reaction conditions. Temperatures and pressures employed in dissolving the phenothiazine are not critical, and any temperature or pressure which will not result in appreciable losses of materials or involve the use of costly equipment can be employed. Atmospheric temperature and atmospheric pressure are preferred.

Some of the impurities of the type referred to hereinabove may be present in the phenothiazine and will, therefore, remain associated therewith when it is dissolved in the solvent; and, accordingly, a preferred embodiment of the present invention contemplates filtering of the solution at this point. The defined impurities will not dissolve in the solvent to any appreciable extent, but the phenothiazine will; hence, filtration at this point will remove a substantial portion of the impurities from the solution. This filtration, which can be effected in any convenient or suitable manner, is generally sufficient to increase the purity of the phenothiazine by an amount of about 0.1 to about seven percent.

Having dissolved the phenothiazine in the aforementioned solvent, and (in the preferred embodiment) after filtering the same, the solution is brought into contact in any suitable manner with the solid with which the final phenothiazine particle is associated to form the improved composition of this invention. The solids must have certain desirable and essential characteristics. They must not be soluble to any appreciable extent in the solvent in which the phenothiazine is dissolved. They must possess no toxic effect to livestock to which the improved composition of this invention will be administered. The solids should possess a large surface area (internal, as well as external), for example, at least about 5 square meters per gram; preferably about 500 to about 900 square meters per gram. Preferably, the solid should be voluntarily edible by the host animal. However, in the event the same is eventually to be employed in the preparation of a drench suspension, it need not be edible nor palatable to the host animal. Additionally, the solid must be one which will not react with the phenothiazine or solvent employed.

Among the solids which can be employed, diatomites, as defined on page 357 of The Condensed Chemical Dictionary, 5th Edition, Reinhold Publishing Corporation, 1956, are especially preferred. Also preferred is mica, such as muscovite, phlogopite, vermiculite, lepidolite and biotite, as defined more particularly, for example, in chapter 26, pages 551 to 566, of Industrial Minerals and Rocks, published by the American Institute of Mining and Metallurgical Engineers, New York, New York, 1949, on pages 314 to 333 of Monmetallic Minerals, by Ladoo and Myers, Second Edition, McGraw-Hill Book Co., New York, 1951, and on pages 327 to 330 of Mineralogy, by Kraus and Hunt, Second Edition, McGraw-Hill Book Co., New York, 1928. Additionally preferred are silicates as defined on page 980 of the same edition of The Condensed Chemical Dictionary defined above. Silica gel is an example of a silicate which can be employed. Algin, which refers to alginic acid and its derivatives, such as sodium alginate, potassium alginate, calcium alginate, etc., can also be employed. Metallic carbonates, such as magnesium carbonate, calcium carbonate, potassium carbonate, etc., are also suitable. Metallic sulphates, such as magnesium sulphate, ferrous sulphate, etc., can also be employed. Gelatin, which is a protein obtained by boiling skin, tendons, ligaments, bones, etc., with water, is also suitable. Animal feeds, such as wheat, corn, oats, barley, sorghum, cotton seed meal, etc., though not preferred, are also useful. In addition, metallic oxides, such as the oxides of maganese, boron, zinc, cobalt, ion, molybdenum, copper, magnesium, etc., can also be used.

Preferably, contact between the solid defined above and the phenothiazine solution previously obtained is effected by placing the solution in a suitable container and thereafter immersing the solid therein. The amount of solution required is, of course, that which is sufficient to contact at least all of the solid which is immersed therein. In order that the solvent solution be not used up rapidly during the process, a large amount of solution is utilized; and solids are continuously immersed in the same, removed, and more solids immersed therein and removed; this being continued until all of the solution or solids, or both, are consumed.

The temperature of the phenothiazine solution in which the solids are immersed can be anywhere from just above the freezing point of the solvent to almost the boiling point thereof. However, two important considerations must be kept in mind. First, the hotter the solvent, the greater its solubility for phenothiazine. By the same token, the hotter the solvent, the greater its vapor pressure and the greater the amount of solvent which will tend to escape from the solution. Atmospheric temperature is, therefore, preferred. Practically any pressure can be employed. However, to be economically feasible, and as far as equipment is concerned, a pressure of about atmospheric is recommended.

Insofar as concerns the amount of contact time required, any contact, however slight, would provide some benefit, provided, of course, there is a meeting between the solution and the solid. However, in order to obtain good contact and to permit the phenothiazine solution to become associated with the solid, a contact time of at least about ten seconds, preferably at least about 15 minutes, is desirable.

The solids defined hereinabove can be brought into contact with the phenothiazine solution, either as an alternative to the immersion defined hereinabove or in addition thereto, by spraying the solution onto the solids, the same conditions previously defined also being applicable.

After the solid has been brought into contact with the phenothiazine solution, the wet solid is treated to remove solvent therefrom. This can be done, for example, by permitting the solvent to evaporate therefrom at atmospheric temperature and pressure. Desirably, however, the wet solid is subjected to some heat and a slight reduction in pressure, so that the vapors, as they are driven off, can be collected in the interest of economy and recycled to the zone wherein the phenothiazine is placed in solution.

Upon removing the solvent, the solid is found to have associated therewith about three to about 85 percent by weight thereof of phenothiazine in particulate form ranging from about 1/8 to about ten, but generally from about 1/4 to about five, microns in size. The amount and size of phenothiazine on the solid will depend on many factors; for example, the surface area (internal, as well as external) of the solid material immersed in the phenothiazine solution, the amount of time the solid was in contact with the solution, and the rate at which the solvent was removed from the solid. Accordingly, the more surface area the solid possesses, the more solution it can carry. If the solid is highly porous, and the contact time has been sufficient to enable the solution to enter the pores thereof, more phenothiazine will remain when the solvent is removed from the solid. The phenothiazine in the pores will have a tendency to be smaller than the phenothiazine on the outer surface of the solid material. If the rate of evaporation of the solvent is accelerated, it is apparent that the size of the phenothiazine crystal will become correspondingly smaller.

What phenomenon is involved herein we do not completely understand, but the final composition obtained is a solid having associated on the surface thereof, and, to some extent, in the pores thereof, phenothiazine in the amount and size defined hereinabove.

The present invention can further be illustrated by reference to the following examples.

EXAMPLE I

A saturated solution of phenothiazine in acetone was obtained by dissolving 500 grams of regular micronized phenothiazine having a purity of 93 percent and having an average particle size of about six to seven microns (at atmospheric temperature and atmospheric pressure) in 3,000 grams of acetone. Phenothiazine of this particle size and extent of purity is simply illustrative, as any of the phenothiazines referred to hereinabove might have been employed. One hundred grams of various solids were then completely immersed in the phenothiazine-acetone solution for 15 minutes. The solid was then removed from solution and permitted to air and drip dry until all of the apparent liquid had been removed. The solid was then permitted to dry in an oven at a temperature of 80° C. until constant weight was obtained. Verxite employed was a mica made by the Zonolite Corporation, Chicago, Illinois. The data obtained are set forth below in Table I.

*Table I*

| Solid Used | Average Particle Size of Solid, Mesh | Percent by Weight of Phenothiazine in Final Composition | Average Particle Size of Phenothiazine in Final Composition in Microns |
|---|---|---|---|
| Verxite | 20 | 44 | 2.6 |
|  | 60 | 48 | 1.3 |
|  | 100 | 52 | 0.8 |
|  | 400 | 56 | 0.3 |
| Silica Gel | 100 | 45 | 1.1 |
|  | 200 | 51 | 0.7 |
|  | 325 | 53 | 0.5 |
|  | 400 | 55 | 0.3 |
| Gelatin | 200 | 41 | 1.2 |
| Sodium Alginate | 200 | 43 | 1.6 |
|  | 200 | 39 | 1.3 |
| Bentonite Clay | 270 | 44 | 1.1 |
|  | 325 | 48 | 0.9 |
|  | 400 | 52 | 0.6 |
| Manganese Dioxide | 400 | 6 | 5.1 |
| Magnesium Sulphate | 200 | 8 | 4.9 |
| Calcium Carbonate | 200 | 7 | 5.2 |
| Cobalt Sulphate | 200 | 5 | 5.4 |
| Copper Sulphate | 200 | 6 | 5.5 |
| Soy Bean Meal | 3½ | 8 | 4.8 |
| Ground Corn | 3½ | 3.5 | 5.9 |
| Ground Corn | 3½ | 3.2 | 6.1 |
| Ground Oats | 3½ | 3.8 | 5.8 |

Note in Table I that, by using verxite, silica gel and bentonite clay, we have been able to add thereto a relatively large amount of phenothiazine; and, in each instance, the phenothiazine was of very small particle size. Additionally, as the size of the base material became smaller, the amount of phenothiazine carried thereby became larger; and the size of the individual phenothiazine particle became smaller. Even with the remaining solid materials employed, the phenothiazine carried thereby was appreciable; and the phenothiazine was of relatively small particle size.

EXAMPLE II

In order to show the effect of the composition of this invention in reducing parasites in livestock animals, and particularly to show its advantage over ordinary phenothiazine alone, several tests were made. A composition comprising silica gel having an average particle size of 200 mesh and phenothiazine was prepared in accordance with the procedure employed in Example I. A drench was prepared using the silica gel-phenothiazine composition, and one using phenothiazine alone. By "drench" we mean a suspension having the consistency of approximately pea soup, which is prepared by incorporating phenothiazine (or the silica gel-phenothiazine composition) with bentonite clay and sodium dodecyl benzene wetting agent in water, and stirring vigorously. In general, the suspension obtained is such that each fluid ounce thereof contains about 10 grams of phenothiazine. Then six fluid ounces of the drench suspension in the case of cattle, three in the case of sheep, are drawn up in a syringe and the same inserted in the animal's mouth. The plunger of the syringe is pushed; and the drench suspension is thereby forced into the animal's throat and thence into its stomach. The results obtained are set forth below in Table II.

lieved to be caused by the controlled or delayed release of the phenothiazine from the composition of this invention, so that, when the composition gets to the small intestines, a sufficient amount thereof is still available to destroy nearly all of the parasites located therein.

The following examples illustrate the fact that the composition of this invention is extremely palatable to animals, while ordinary phenothiazine is not.

EXAMPLE III

Phenothiazine having an average particle size of about six microns and a purity of 99.9 percent was added to the animals' regular feed regimen of ground feed consisting of 60 percent by weight ground corn and 40 percent of ground oats so that the resulting ground feed obtained was such that each pound of the mix contained 30 grams of phenothiazine. To increase the palatability of the ground feed mix, blackstrap molasses in an amount of about eight percent by weight thereof was added thereto. Six cattle weighing approximately 380 pounds each were placed in a dry lot; and the feed which they had been eating, the regular feed regimen described above, was removed from the animals the night before. The next morning, two pounds of the ground mix feed which had been prepared was placed in front of each animal. Two pounds of mix was selected so that each animal would obtain the full therapeutic dose of 60 grams of phenothiazine. In the first hour, the animals had consumed an average of one pound of the mix, so that they had consumed individually 30 grams of phenothiazine. Although the mix was left in front of the animals until the following morning, they did not consume additional feed. After 24 hours, the remaining feed was removed; and the

*Table II*

| Animal | Average Weight of Individual Animal, Pounds | Percent Parasite Reduction Based on Egg Count | | | | | | Remarks |
|---|---|---|---|---|---|---|---|---|
| | | Haem-onchus | Oesopha-gostuhum | Tricho-strongylus | Oster-tagia | Coop-eria | Nemato-dirus | |
| Cattle | 410 | 98 | 96 | 88 | 87 | 84 | 86 | Drenched with 60 grams of 2 to 3 micron phenothiazine having a purity of 99.9%. |
| Cattle | 425 | 100 | 95 | 91 | 92 | 94 | 84 | Drenched with 60 grams of the silica gel-phenothiazine composition. Phenothiazine in this composition had a purity of 99.9%. |
| | 415 | 100 | 98 | 90 | 93 | 96 | 89 | |
| | 405 | 100 | 94 | 93 | 90 | 93 | 91 | |
| | 430 | 97 | 100 | 94 | 90 | 91 | 85 | |
| Sheep | 60 | 100 | 93 | 87 | 92 | 87 | 89 | Drenched with 30 grams of 2 to 3 micron phenothiazine having a purity of 99.9%. |
| Sheep | 65 | 100 | 90 | 92 | 89 | 96 | 93 | Drenched with 60 grams of the silica gel-phenothiazine composition. Phenothiazine in this composition had a purity of 99.9%. |
| | 60 | 100 | 94 | 98 | 91 | 97 | 84 | |
| | 55 | 100 | 96 | 96 | 94 | 91 | 96 | |
| | 70 | 100 | 91 | 90 | 93 | 90 | 92 | |

The precent reduction in parasites was based on egg count, since this is the standard procedure employed by parasitologists in determining the efficiency of anthelmintics. In order to determine the pretreatment egg count, egg counts were taken from each animal for a period of five days prior to treatment; and the average egg count determined. The animals where then treated with a drench as described above; and the egg count was checked on the fourteenth day after treatment. The percent reduction was based on the reduction in the number of eggs between the pretreatment and post-treatment egg counts.

Of the parasites referred to in Table II, generally the Cooperia and a portion of the Trichostrongylus are harbored in the small intestine. All of the other parasites mentioned are either in the abomasum (stomach) or large intestines. Phenothiazine alone is an excellent wormer in the stomach and in the large intestines, but not as effective in the small intestines. Attention is invited to the data in Table II wherein it is shown that the action of the composition of this invention is far more effective against parasites in the small intestines than phenothiazine alone, while being at least as effective as phenothiazine alone in its action against the remaining parasites. This is beanimals were permitted to go back to the untreated feed. This they immediately ate.

EXAMPLE IV

The same procedure employed in Example III was also employed with six sheep averaging 68 pounds each, except that one pound of the treated mix was employed. This was done so that they would have access to 30 grams of phenothiazine, a full therapeutic dose. In the first 12 hours, the sheep had consumed on an average about one-third of the mix; that is, about 10 grams of phenothiazine per sheep. The feed was left in front of the sheep for 24 hours, but no additional feed was consumed. At the end of this period, the feed mixture was removed; and untreated feed was left before them. This they immediately ate, as in the case of Example III.

EXAMPLE V

A phenothiazine-silica gel composition prepared as in Example I (wherein the silica gel has a particle size of 200 mesh and has associated therewith 51 percent by weight of phenothiazine having an average particle size of 0.7 microns) was mixed with the same ground feed employed in Example III so that one pound of the final mix contained 30 grams of phenothiazine. Following the procedure of the previous examples, two pounds of the treated feed mix was placed before nine cattle each weighing 360 pounds. In 35 minutes, the animals had consumed the entire feed. This, of course, means that each animal had received the full therapeutic dose of 60 grams of phenothiazine per animal.

EXAMPLE VI

When the test of Example V was repeated with eleven cattle weighing approximately 425 pounds each, the cattle consumed all of the feed in approximately 30 minutes.

EXAMPLE VII

The test of Example V was also repeated with 14 head of cattle weighing approximately 425 pounds each. The cattle ate the treated feed in approximately 20 minutes.

EXAMPLE VIII

Eleven sheep weighing approximately 55 pounds each were placed in a dry lot; and their feed taken away from them the night before treatment. The following morning, each of the sheep was given one pound of feed having admixed therewith 63 grams of a phenothiazine-bentonite clay composition prepared as in Example I, wherein the bentonite clay has a particle size of 325 mesh and has associated therewith 48 percent by weight of phenothiazine having an average particle size of 0.9 micron. The sheep consumed this feed in approximately 55 minutes, each sheep receiving a full therapeutic dose of 30 grams of phenothiazine.

EXAMPLE IX

When the run of Example VIII was repeated with 18 sheep weighing approximately 65 pounds each. They con- the treated feed mixture in approximately 45 minutes.

EXAMPLE X

The run of Example VIII was also repeated on 26 sheep weighing approximately 65 pounds each. The consumed the entire mix in approximately 40 minutes.

EXAMPLE XI

Eight pigs weighing approximately 80 pounds each were put in a pen, and all of their feed removed the night before treatment. The following morning, eight grams of phenothiazine per animal was mixed with one pound of their regular feed, consisting of about 65 percent by weight ground corn and 35 percent by weight ground oats, and this feed was placed in front of the pigs. At the end of 12 hours, the pigs had consumed about one-fourth of the treated feed; at the end of 24 hours, about one-third. The treated feed was removed; and the regular feed placed before them. This they immediately ate.

EXAMPLE XII

Eleven pigs weighing aproximately 75 pounds each were put in a separate pen, and all the feed removed therefrom the night before treatment. The following morning, each of the pigs was given one pound of the same feed employed in Example XI having admixed therewith 17 grams of a phenothiazine-bentonite clay composition prepared as in Example I, wherein the bentonite clay has a particle size of 325 mesh and has associated therewith 48 percent by weight of phenothiazine having an average particle size of 0.9 micron. The pigs consumed the treated feed mixture in 15 minutes, thereby receiving the full therapeutic dose of about eight grams of phenothiazine.

Examples III through XII illustrate the advantages of the composition of the invention and show that the same is extremely palatable to livestock. This is important in that, by using the composition of the present invention, one can easily and effectively administer phenothiazine to livestock, thus eliminating the costly, hazardous and time-consuming operation of rounding up the animals and treating them individually.

Since it is obvious that many changes and modifications can be made in the above-described details without departing from the nature and spirit of the invention, it is to be understood that the invention is not to be limited thereto, except as set forth in the appended claims.

We claim:
1. A process for preparing an improved composition which comprises dissolving phenothiazine in a solvent, contacting a solid material selected from the group consisting of diatomites, micas, silicates, algin, metallic carbonates, metallic sulphates, gelatin, animal feeds and metallic oxides with the phenothiazine solution and thereafter removing said solvent from the solid so contacted.

2. A process for preparing an improved composition which comprises dissolving phenothiazine in acetone, contacting a solid material selected from the group consisting of diatomites, micas, silicates, algin, metallic carbonates, metallic sulphates, gelatin, animal feeds and metallic oxides with the phenothiazine-acetone solution and thereafter removing acetone from the solid so contacted.

3. A process for preparing an improved composition which comprises dissolving phenothiazine in acetone, contacting a diatomite with the phenothiazine-acetone solution and thereafter removing acetone from the diatomite so contacted.

4. A process for preparing an improved composition which includes dissolving impure phenothiazine in acetone; filtering the solution obtained to separate insoluble impurities therefrom; contacting a solid material selected from the group consisting of diatomites, micas, silicates, algin, metallic carbonates, metallic sulphates, gelatin, animal feeds and metallic oxides with the remaining phenothiazine-acetone solution; and thereafter removing acetone from the solid so contacted.

5. The product obtained by the process of claim 1.

References Cited by the Examiner
UNITED STATES PATENTS

| 2,330,340 | 9/1943 | Dieter | 167—33 |
| 2,407,486 | 9/1956 | Flenner | 167—53 |
| 2,777,795 | 1/1957 | Veaux | 167—42 |
| 3,005,753 | 10/1961 | Vierling | 167—53 |
| 3,008,873 | 11/1961 | Rogers | 167—53 |

JULIAN S. LEVITT, *Primary Examiner.*

MORRIS O. WOLK, FRANK CACCIAPAGLIA, JR., LEWIS GOTTS, *Examiners.*